UNITED STATES PATENT OFFICE.

J. C. SCHEMMANN, OF HAMBURG, GERMANY.

IMPROVEMENT IN THE MANUFACTURE OF STEEL.

Specification forming part of Letters Patent No. 38,504, dated May 12, 1863.

*To all whom it may concern:*

Be it known that I, JOHANN CARL SCHEMMANN, of Hamburg, Germany, have invented certain new and useful Improvements in the Manufacture of Steel; and I hereby declare that the following is a full, clear, and exact description of the same.

My invention consists in operating upon iron in the puddling-furnace and subsequently in manner hereinafter described.

When iron in the puddling-furnace reaches that point where the escape of carbonic oxide ceases the melted iron assumes a granular state. In this state the melted iron has lost its properties as pig or raw iron, the greater portion of the carbon having escaped, and part of the other heterogeneous substances commonly found in iron having been volatilized or mixed with the slag. The iron in this state is no longer pig-iron, but has become purified iron containing a certain quantity of carbon, and in this combination it is hard steel richly saturated with carbon. On the metal being worked through still further under suitable regulation of the furnace, every conversion beyond this granular state causes a decrease of carbon in the metal until it will finally become iron. Between each grade of further decarbonization the mass has become steel containing a different amount of carbon, and is of a different degree of hardness—say from the maximum to the minimum. Up to the present this fact has not been sufficiently acknowledged, or, rather, no attention has been paid to discover a process in order to obtain steel at the various stages of the decarbonization. Now, I commence to operate upon the iron as soon as it assumes the granular state in the puddling-furnace. On the mass reaching that granular state which I consider fit for the particular kind of steel I desire to produce, I at once shut off the draft in the furnace, open the door, and take the whole mass out as quickly as possible and throw it into cold water, by which means the steel hardens and gets rid of the slag and cinder.

It will need attention and experience to determine the right moment for obtaining that particular kind of steel required, yet a pretty infallible guide will be found in the appearance of the mass; and even if the right moment should escape steel will be produced suitable for some purpose. The more the mass consists of isolated granules the greater is the amount of carbon it contains; and, again, the more these granules combine and weld together the greater is the decarbonization of the same. Consequently the amount of carbon or the hardness of the steel to be produced will depend on the choice of the moment, or rather on the state in which the mass has been taken out of the furnace and hardened. If, for instance, I take the mass out at that moment when the granules have just formed, I obtain highly-carbonized and extremely hard steel with isolated grains. If the working or puddling of the mass be carried on still further, carbon escapes and the grains begin to weld together, and the higher the decarbonization the more the granules will unite and weld. If I take the mass out of the furnace in the first state of welding of the granules, I obtain steel in granular, porous, sponge-like lumps. In each following state these lumps come out in a more combined and less porous state, and the more or less porous they are the more or less hard is the steel produced. The steel thus made is fit for further working simply by hammering it into pieces; but I prefer to still better prepare it for further application and working by carefully crushing and reducing it under a stamp-hammer or rollers, or in a mill. The granular or porous lumps of steel which are in a dry state will be crushed into coarser and finer parts, according to the hardness of the granules. The highest degree of hardness produces the finest particles. This crushed steel is cleaned from slag and cinder by means of a sieve, or by washing, and is then sorted. If the cleansing be done by washing, the material should be well and quickly dried in order to have it in a pure state and to prevent oxidation. The finer as well as the coarser steel granules or crushed steel thus obtained are equally suited for the manufacture of cast-steel and refined or welding steel—namely, first, for cast-steel by melting it in crucibles or pots in the ordinary manner, and, second, for refined or welding steel by welding it in a welding-furnace in the following manner invented by me: I place the crushed steel granules into boxes or cases made of iron or steel, close the same from the access of air by a cover of the same material, and put them thus prepared into a welding-furnace, where I subject them to a gentle welding-heat. The steel, being free from slag and rust, then welds readily into a pure mass of steel without sustaining any further loss of carbon than that which the boxes, if of iron, may take up. When these boxes or cases have reached a suitable welding-heat they are taken out of the furnace and brought, with their contents, under the hammer. After having been gently and carefully hammered on all sides they can be formed into blooms, lumps, or ingots of any shape suitable for those purposes for which the steel may be required.

Having now described the nature of my said invention and in what manner the same is to be performed, I declare that I claim as my improvements in the manufacture of steel—

1. Manufacturing steel in a granular and spongy state by withdrawing it from the puddling-furnace at the stages hereinbefore described and plunging it in cold water.

2. Manufacturing refined steel by inclosing the granular steel, obtained as hereinbefore described, in iron or steel cases, submitting the same to welding-heat, and subjecting the cases and their contents to hammering, as hereinbefore described.

In testimony whereof I have signed my name to this specification before two subscribing witnesses.

J. C. SCHEMMANN.

Witnesses:
GEO. HUTTON,
CH. ARMENGAUD.